May 3, 1932. E. S. ZIEGLER 1,856,683
TRUCK BODY
Filed May 27, 1930
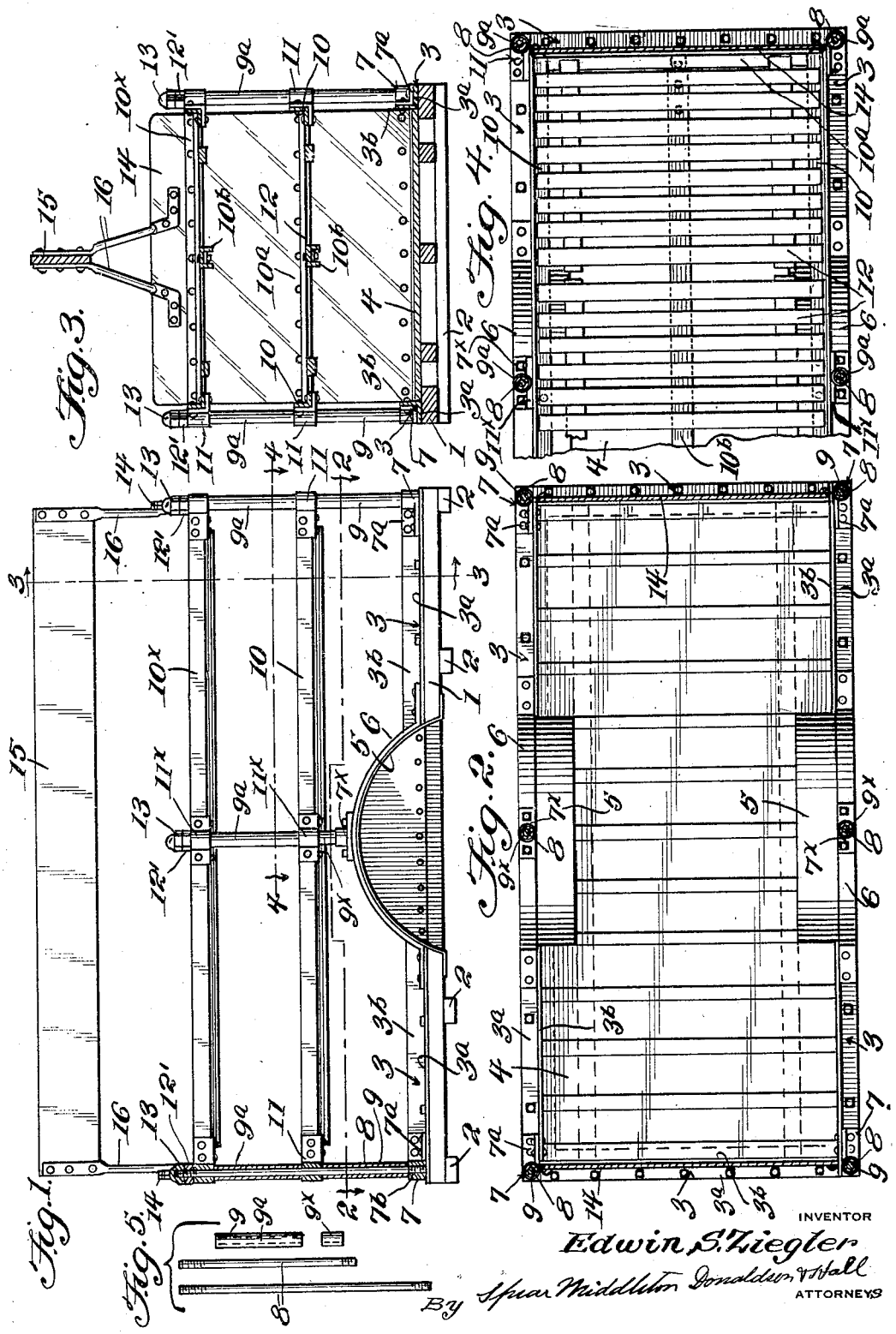
INVENTOR
Edwin S. Ziegler
By Spear Middleton Donaldson & Hall
ATTORNEYS Patented May 3, 1932

1,856,683

UNITED STATES PATENT OFFICE

EDWIN S. ZIEGLER, OF YORK, PENNSYLVANIA, ASSIGNOR TO YORK-HOOVER BODY CORPORATION, OF YORK, PENNSYLVANIA, A CORPORATION OF PENNSYLVANIA

TRUCK BODY

Application filed May 27, 1930. Serial No. 456,163.

My present invention relates to improvements in truck bodies or frames designed for the use of bottlers for transporting bottled beverages in cases.

The invention aims to provide a simple, economical and durable construction, embodying a plurality of decks, which is of the knockdown character, whereby it will occupy relatively small space when disassembled, thereby effecting economy in freight shipment and otherwise merchandizing the equipment.

The invention further aims to provide a construction convertible as to number of case supporting decks, whereby the capacity of the truck may be readily enlarged according to increased demands of a growing business.

Another object is to provide a construction in which the amount of clearance between decks may be readily changed as desired.

Still another object is to provide a construction in which repairs can be effected with speed and economy, by reason of the use of readily removable and replaceable parts of a standard and interchangeable nature.

With these and other objects in view the invention includes the novel features of construction and arrangement and combination of parts hereinafter described, my invention being defined by the claims appended hereto.

An embodiment of the invention is illustrated in the accompanying drawings in which Figure 1 is a side elevation partly in section.

Fig. 2 is a section on line 2—2 of Fig. 1.

Fig. 3 is a section on line 3—3 of Fig. 1.

Fig. 4 is a section on line 4—4 of Fig. 1 partly broken away.

Fig. 5 is a detail view illustrating the sleeves.

Preliminary to a detailed description of my improved construction I may state that the body frame is designed for use upon the ordinary or any desired form of truck chassis, which, as it forms no part of the present invention, is not illustrated herein. The body frame selected as an example is adapted for use on a truck having relatively high rear wheels, and hence the body is shown with wheel pockets which, of course would be omitted where the truck was of a low wheeled character not rendering these necessary.

My improved body as herein shown comprises a main frame composed of side sills 1 and cross sills 2. Where wheel pockets are desired, as in the construction shown, the side sills are interrupted at the center of the body to provide space for the wheels, the adjacent ends of the sills being connected by the wheel pocket frames as hereinafter described.

To the upper surfaces of the sills are secured angle irons 3 having horizontal webs bolted to the side and end frame members and vertical webs $3^b$ extending entirely around the base except at the wheel pockets to serve as a retaining flange to prevent cases from slipping off the body.

Within the retaining flanges the body is provided with a flooring indicated at 4. The wheel pockets are indicated at 5 and are formed of sheet metal having the lower ends of their arched portions secured to the inner ends of the sills 1. Overlying the said arched portions of the wheel pockets are correspondingly curved metal bars 6 having horizontally extending end portions bolted to the sills 1 and overlying webs $3^a$ of the angle irons 3.

At the corners of the body or bed frame are located brackets 7 having angle bar portions $7^a$ bolted or otherwise suitably secured to the sills 1 and overlying horizontal webs $3^a$ and also similarly secured to the vertical webs $3^b$, and having also vertical internally threaded openings, to receive vertical posts 8, the lower ends of which posts are correspondingly threaded and screwed into the threaded openings $7^b$, said posts serving to support upper decks in the manner hereinafter described.

Where the body is of such length as to require it, additional posts may be provided varying in number in accordance with the length of the body. In the form shown in the drawings I have shown one set of intermediate posts and in order that these may be located midway between the ends of the body I support them by bracket members 7ˣ, secured to the tops of the arched bars 6, the posts being of such shorter length as to bring their tops at the same height as the tops of the end posts. Over these rods are slipped sleeves 9, the lower ends of which rest upon the tops of the bracket members while their upper ends serve to support the next upper deck frame, the sleeves being of such length that the said deck frame will be positioned the desired distance above the base portion. Said deck frame is composed of side bars 10 and end bars 10ᵃ of angle iron having vertical and inwardly directed horizontal webs, said bars being secured together at the corners by bracket members 11 having angular wings bolted to the ends of said bars and having vertical openings to receive the rods.

Midway of the side bars 10 they are provided with bracket members 11ˣ bolted or otherwise fastened to their outer faces and having vertical passages for the intermediate posts, the central portions of said side frame being supported by short sleeves 9ˣ.

Said deck frame 10—10ᵃ is designed to carry a slatted flooring or rack 12 (preferably made in sections) which rests upon the horizontal flanges of the bars 10, 10ᵃ within the vertical webs or flanges thereof whereby lateral movement is prevented.

If desired the deck frame may be provided with additional slat supporting means in the shape of frame bar 10ᵇ.

Where more than one upper deck is desired the posts are made of such length that, after the first deck frame 10—10ᵃ is in place, a second set of sleeves 9ᵃ is slipped onto the posts and a second deck frame 10ˣ similar to that previously described, is then applied to the posts. If no other decks are desired and this (10ˣ) constitutes the topmost deck, this is secured in place by nuts 12 and achorn lock nuts 13 threaded on the upper ends of the posts.

If desired the body may be provided with end panels 14 bolted to the vertical flanges of the end bars, and a sign board 15 supported by brackets 16 from the upper ends of said panel members.

It will be apparent that if a bottler has a plant of small capacity he may provide himself with a truck body having only one deck, for example.

Should subsequent business conditions require, he can enlarge the capacity of the truck by substituting longer posts and using therewith additional struts and deck or decks.

It will also be obvious that as the parts are all detachable and standardized damage can easily be repaired by mere substitution of parts which are easily procurable.

Having thus described my invention what I claim is:

1. A truck body of the character described comprising a bed frame, brackets secured to the corners and sides of said bed frame, corner and side posts removably secured at their lower ends to said brackets, lower and upper deck frames having corner and side brackets provided with vertical openings receiving said posts to removably connect the deck frames to said posts, sleeves removably positioned on said posts between the bed frame and lower deck frame brackets and between the lower and upper deck frame brackets in contact with said brackets, and means removably engaged with the upper ends of said posts and contacting with the upper deck frame brackets to hold both deck frames and the sleeves against accidental upward movement on the posts.

2. A truck body of the character described comprising a bed frame, brackets secured to the corners and sides of said bed frame, corner and side posts having their lower ends removably engaged in said brackets, sleeves shorter than said posts and removably positioned thereon with their lower ends resting on said brackets, a deck frame comprising side and end bars, corner brackets connecting said bars, side brackets secured to said side bars, said deck frame brackets having vertical openings receiving said posts to removably connect said deck frame to said posts, said deck frame brackets resting on the upper ends of said sleeves, and means removably secured to said posts and contacting with the upper sides of said deck frame brackets to hold said deck frame and sleeves against accidental upward movement on said posts.

In testimony whereof I affix my signature.

EDWIN S. ZIEGLER.